United States Patent
Kamkar et al.

(10) Patent No.: US 11,298,659 B2
(45) Date of Patent: Apr. 12, 2022

(54) WATER DISPENSING DEVICE FOR DISPENSING WATER HAVING CONSISTENT TASTE

(71) Applicant: Conopco, Inc., Englewood Cliffs, NJ (US)

(72) Inventors: Kirtan Shravan Kamkar, Nagpur (IN); Skand Saksena, Bangelore (IN); Vishal Kumar Trivedi, Sagwara (IN)

(*) Notice: Subject to any disclaimer, the term of this patent is extended or adjusted under 35 U.S.C. 154(b) by 109 days.

(21) Appl. No.: 16/761,424

(22) PCT Filed: Oct. 30, 2018

(86) PCT No.: PCT/EP2018/079622
§ 371 (c)(1),
(2) Date: May 4, 2020

(87) PCT Pub. No.: WO2019/091818
PCT Pub. Date: May 16, 2019

(65) Prior Publication Data
US 2020/0384415 A1 Dec. 10, 2020

(30) Foreign Application Priority Data
Nov. 9, 2017 (EP) .................................. 17200749

(51) Int. Cl.
*B01D 61/12* (2006.01)
*B01D 61/02* (2006.01)
(Continued)

(52) U.S. Cl.
CPC .......... *B01D 61/12* (2013.01); *B01D 61/025* (2013.01); *B01D 61/08* (2013.01); *B67D 1/0014* (2013.01);
(Continued)

(58) Field of Classification Search
CPC .......... B01D 2311/24; B01D 2311/246; B01D 2311/25; B01D 2313/18; B01D 2313/19;
(Continued)

(56) References Cited

U.S. PATENT DOCUMENTS 7,507,334 B1 * 3/2009 Sigona ................. B01D 61/025
210/196

FOREIGN PATENT DOCUMENTS

CN 102583808 7/2012
CN 204607724 9/2015
(Continued)

OTHER PUBLICATIONS

Search Report and Written Opinion in EP17200749; dated May 28, 2018.
(Continued)

*Primary Examiner* — Terry K Cecil
(74) *Attorney, Agent, or Firm* — Edward A. Squillante, Jr.

(57) ABSTRACT

The water dispensing device of the present invention with the given flow path of water and the control circuit configured store at least two threshold TDS values $X_A$ and $X_B$, wherein $X_A$ is a higher TDS value than $X_B$; and to drain water from the treatment unit through the drain line, when TDS value sensed is higher than $X_A$, and alternately when the sensed value of TDS is less than $X_B$ then direct water from the reject line into the first recycle line; it was seen that the TDS of the output water of the device was in a constant range and the device of the present invention also contributed to minimizing the wastage of water by allowing recycling of water through the reject line of the treatment unit.

6 Claims, 2 Drawing Sheets

(51) Int. Cl.
*B01D 61/08* (2006.01)
*B67D 1/00* (2006.01)
*B67D 1/08* (2006.01)
*B67D 1/12* (2006.01)
*C02F 1/00* (2006.01)
*C02F 1/44* (2006.01)

(52) U.S. Cl.
CPC ......... *B67D 1/0884* (2013.01); *B67D 1/1277* (2013.01); *C02F 1/008* (2013.01); *C02F 1/441* (2013.01); *B01D 2311/246* (2013.01); *B01D 2311/25* (2013.01); *B01D 2313/18* (2013.01); *B01D 2313/19* (2013.01); *C02F 2201/005* (2013.01); *C02F 2209/10* (2013.01); *C02F 2301/046* (2013.01)

(58) Field of Classification Search
CPC ...... B01D 61/025; B01D 61/08; B01D 61/12; B67D 1/0014; B67D 1/0884; B67D 1/1277; C02F 1/001; C02F 1/006; C02F 1/008; C02F 1/283; C02F 1/32; C02F 1/441; C02F 2201/004; C02F 2201/005; C02F 2209/003; C02F 2209/005; C02F 2209/006; C02F 2209/03; C02F 2209/05; C02F 2209/10; C02F 2209/40; C02F 2301/043; C02F 2301/046
See application file for complete search history.

(56) References Cited

FOREIGN PATENT DOCUMENTS

| | | |
|---|---|---|
| CN | 204803122 | 11/2015 |
| CN | 105481058 | 4/2016 |
| CN | 205151844 | 4/2016 |
| CN | 104291414 | 6/2016 |
| CN | 105621535 | 6/2016 |
| CN | 205965523 | 2/2017 |
| CN | 206204030 | 5/2017 |
| CN | 2693751 | 4/2020 |
| EP | 0599281 | 6/1994 |
| EP | 3072577 | 9/2016 |
| JP | 2006305499 | 11/2006 |
| JP | 2008237972 | 10/2008 |
| JP | 2014104396 | 6/2014 |
| WO | WO-2013034396 A1 * | 3/2013 ............. B01D 61/12 |

OTHER PUBLICATIONS

Search Report and Written Opinion in PCTEP2018079622; dated Dec. 10, 2018.
Written Opinion in PCTEP2018079622; dated Oct. 11, 2019.

* cited by examiner

WATER DISPENSING DEVICE FOR DISPENSING WATER HAVING CONSISTENT TASTE

FIELD OF THE INVENTION

The present invention relates to a water dispensing device. The present invention more particularly relates to a water dispensing device which maintains total dissolved solids (TDS) in a given range in the output water which maintains the taste of output water almost constant irrespective of the variation in input TDS levels or any other variation in TDS which occur over a period of time in the dispensing device.

BACKGROUND OF THE INVENTION

There are various sources of input water into a water dispensing device and different sources may have different TDS levels which may affect the taste of output drinking water from the device. Also, over a period of time, due to continued usage of salt removal treatment units, the capability of a treatment unit to remove salts may vary and therefore, the output drinking water may differ in taste over a period of lifetime of the salt removal unit.

There are various salt removal treatment units used in water purifiers, of which Reverse Osmosis (RO) membranes are quite popular. RO devices work on the principle of reduction in dissolved solids from the input water. Water has a particular taste partly because of the dissolved solids. Removal of dissolved solids beyond a certain point may adversely affect the taste. Similarly, if higher amount of dissolved solids remain in the output water (also called permeate), the taste of water may still be unpalatable at least to some consumers. Therefore, in order to adjust the taste of permeate water, remineralization means are used in some RO devices. But that involves adding of minerals from another source and may increase the cost of the water purifier.

U.S. Pat. No. 7,507,334 B1 (SIGONA JON-ANDREW VINCENT, 2009) discloses a modular-filter based RO water treatment system that remineralizes purified water twice to ensure the water is alkaline, but uses only one remineralization filter made of calcite. Calcium carbonate causes drastic increase in total dissolved solids (TDS), which may render the water unpalatable at least to some consumers. It also discloses that reverse osmosis filters remove on an average 98% sediments, organics and dissolved salts and reduce the pH to about 6.2 to 6.8 with only 5 to 15 ppm of dissolved salts. The remineralisation filter containing mineral calcite raises the pH to about 7.0 and dissolved salts to about 30 on an average and finally the pH to about 7.5 to 8.5 and total solids to 60 ppm.

WO 2013/034396 (Unilever) discloses that a cartridge comprising calcium carbonate and magnesium carbonate in a certain combination provides controlled increase in TDS irrespective of the TDS levels in the input water, thereby making the water palatable.

JP2006305499 (MIURA CO LTD)—invention described is provided with a membrane filtration unit to remove impurities in the water supply to a claim, with part of the concentrated water to drain from the membrane filtration of this, there is provided a method of operation of membrane filtration system is refluxed to the upstream side of the membrane filtration unit said the remainder, said water supply to the unit membrane filtration, membrane filtration wherein the characterized in that on the basis of the quality of water supply to the unit membrane filtration above, to adjust the amount of drainage of the concentrated water, or water temperature in one of the concentrated water from the unit membrane filtration and said permeate from the unit.

The cited prior art does not disclose how to maintain uniform TDS level in the output water that has been purified using a reverse osmosis process where there is significant variation in the TDS levels of the input water. This is important considering the fact that there may be significant variation in the TDS levels from various sources of water and over the lifetime of the water purifier. The prior art does not disclose any means to control the recycle line and the reject water invariably always flows through the recycle line. The control of water entering into the recycle line is lacking which will almost always cause some unmeasured amount of water to flow through the recycle line of JP2006305499.

EP0599281, discloses a process for the treatment of liquids according to the principle of reverse osmosis, in particular for the recovery of substantially pure water from tap water, brackish water or salt water by means of a membrane module having a device. This design of a device providing recirculation of reject water can easily harm the device and the RO membrane as there will be intermittent pressure drop.

Therefore, there is a need to provide an efficient device and method capable of achieving any constant TDS range value irrespective of the input/feed water TDS value.

SUMMARY OF THE INVENTION

The present invention provides a water dispensing device for providing output water in a constant Total Dissolved solids (TDS) range and which also helps in minimizing wastage of water.

First aspect of the present invention provides a water dispensing device for providing output water in a constant TDS range, the device comprising:
 a. a feed water inlet;
 b. a reverse osmosis unit positioned downstream and in fluid communication with the inlet; the treatment unit having a treated water line and a reject water line;
  wherein, the reject water line is split by a multichannel connector into, a drain line for draining the reject water and a first recycle line adapted to allow reject water from the treatment unit, to flow into the line upstream of the treatment unit, the first recycle line comprising a second drain line downstream of the multichannel connector;
  and a second recycle line emanating from the reject line having a third drain line emanating from the second recycle line downstream of the multichannel connector;
  and
  wherein, either a multi-way valve is positioned at the multichannel connector or one valve corresponding for every split line, a drain line valve on the drain line and a first recycle line valve on the first recycle line downstream of the multichannel connector; and
 c. a TDS sensor on the treated water line adapted to measure TDS of the water flowing out of the treatment unit;
 d. an outlet for dispensing water; and
 e. a control circuit configured to:
  i. store at least two threshold TDS values $X_A$ and $X_B$, wherein $X_A$ is a higher TDS value than $X_B$;
  ii. drain water from reject line of the treatment unit through the drain line, when TDS value sensed is higher than $X_A$, and alternately when the sensed value of TDS is less than $X_B$ then direct water from the reject line into the first recycle line; and iii. direct water to flow through the second recycle line (5C) when the sensed threshold value is higher than $X_B$ but less than $X_A$;

when the device is in operation.

Second aspect of the present invention provides a method for providing output water in a constant TDS range by the device according to the first aspect, the method comprising, i. providing water through inlet into the treatment unit;

ii. sensing TDS of the water in the treated water line by the TDS sensor;

iii. configuring the control circuit to a set at least two threshold values of TDS, $X_A$ and $X_B$;

iv. comparing the TDS sensed in step with the stored threshold TDS values $X_A$ and $X_B$; and v. drain water from reject line of the treatment unit only through the drain line, when TDS value sensed is higher than $X_A$, and alternately when the sensed value of TDS is less than $X_B$ then direct water from the treatment unit into the first recycle line;

to obtain the output water in a constant TDS range.

Another aspect of the present invention provides a use of a control circuit configured to choose from the options selected from the group:

i. water from the reject line only flows through the drain line when sensed TDS is higher than $X_A$.

ii. water from the reject line flows through the first recycle line and a second drain line when sensed TDS is less than $X_B$; or iii. when water from the reject line flows through the second recycle line and the third drain line when sensed TDS is higher than $X_B$ and less than $X_A$;

when the device is in operation;

in a water dispensing device for providing output water in a constant TDS range, the device comprising:

a. a feed water inlet;

b. a reverse osmosis unit positioned downstream and in fluid communication with the inlet; the treatment unit having a treated water line and a reject water line;

wherein, the reject water line is split by a multichannel connector into, a drain line for draining the reject water and a first recycle line adapted to allow reject water from the treatment unit, to flow into the line upstream of the treatment unit, the first recycle line comprising a second drain line downstream of the multichannel connector;

and a second recycle line emanating from the reject line having a third drain line emanating from the second recycle line downstream of the multichannel connector;

and wherein, either a multi-way valve is positioned at the multichannel connector or one valve corresponding for every split line, a drain line valve on the drain line and a first recycle line valve on the first recycle line downstream of the multichannel connector and c. a TDS sensor on the treated waterline adapted to measure TDS of the water flowing out of the treatment unit;

d. an outlet for dispensing water to provide TDS of the output water from the treatment unit in a constant range.

Another aspect of the present invention provides a use of a control circuit configured to choose from the options selected from the group:

i. water from the reject line only flows through the drain line when sensed TDS is higher than $X_A$.

ii. water from the reject line flows through the first recycle line and a second drain line when sensed TDS is less than $X_B$; or iii. when water from the reject line flows through the second recycle line and the third drain line when sensed TDS is higher than $X_B$ and less than $X_A$;

when the device is in operation;

for use in a water dispensing device for minimizing wastage of water.

Another aspect of the present invention provides use of the device of first aspect to provide TDS of the output water from the treatment unit in a constant range.

Another aspect of the present invention provides use of the device of first aspect for use in a water dispensing device for minimizing wastage of water.

These and other aspects, features and advantages will become apparent to those of ordinary skill in the art from a reading of the following detailed description and the appended claims.

BRIEF DESCRIPTION OF DRAWINGS

The invention will now be described into more detail with reference to the accompanying drawings whereby.

DETAILED DESCRIPTION OF THE INVENTION

Figure 1:
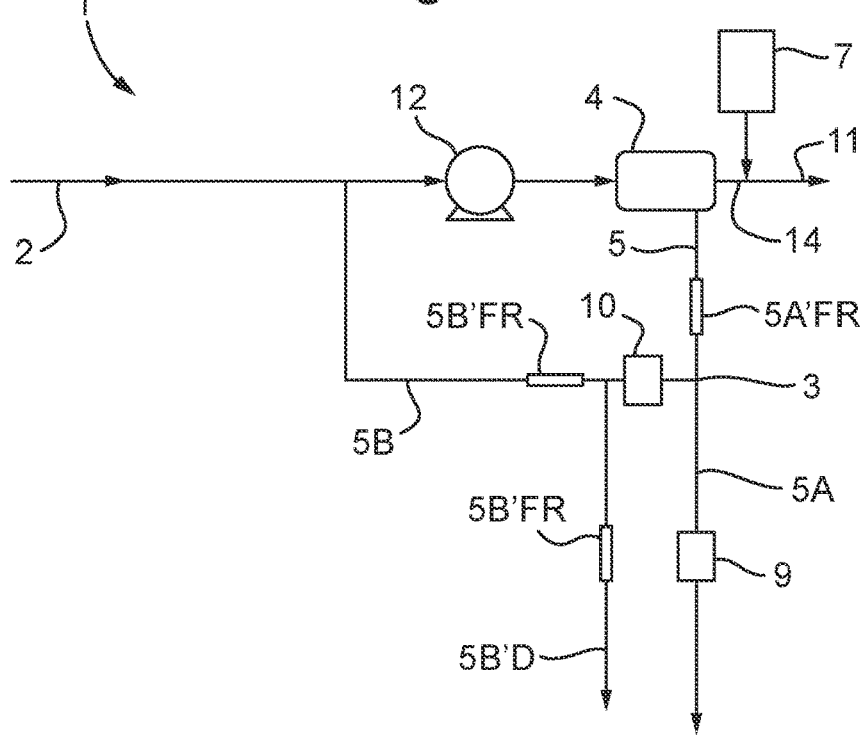
FIGS. 1, 2 and 3 show the water flow diagram of the present invention.

For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se.

Except in the operating and comparative examples, or where otherwise explicitly indicated, all numbers in this description indicating amounts of material or conditions of reaction, physical properties of materials and/or use are to be understood as modified by the word "about".

Numerical ranges expressed in the format "from x to y" are understood to include x and y. When for a specific feature multiple preferred ranges are described in the format "from x to y", it is understood that all ranges combining the different endpoints are also contemplated.

As used herein, the indefinite article "a" or "an" and its corresponding definite article "the" means at least one, or one or more, unless specified otherwise.

The present invention provides a dynamic, sensitive and precise circulation of water controlled by the control circuit to achieve a constant taste and save water. The invention also provides a robust recirculation system which does not affect the working or life of the RO membrane or of the device.

Devices with recirculation of the reject water often provide a recycle line and then switch over between the recycle line and the drain line, but this can easily harm the device and the RO membrane as there will be intermittent pressure drop. This problem is solved by the present invention by having at least two recycle lines and corresponding drain lines.

The present invention is more dynamic and works in a continuous and real-time manner to operate opening and closing of valves based on real-time sensed TDS values in the permeate line.

Reverse osmosis units or other desalination devices are conventionally used at places where the total dissolved solids (TDS) of water are high. However, nowadays, such devices are also being used at places where the TDS may not be high. Generally, the TDS of surface water e.g., water that comes from lakes and reservoirs ranges from 70 to 120 ppm. On the other hand, TDS of river or stream water ranges from 250 to 500 ppm. At some places, underground water, e.g. bore-well water is supplied. This water, by far, has very high TDS which may range from 500 to 2000 ppm.

While some amount of dissolved solids lend water its characteristic taste. TDS less than 25 ppm or more than 200 ppm may make it unpalatable to some consumers.

Reverse osmosis (RO) is a membrane filtration method that removes many types of large molecules and ions from solutions by applying pressure to the solution when it is on one side of a selective membrane. The result is that the solute is retained on the pressurized side of the membrane and the pure solvent is allowed to pass to the other side. To be "selective," this membrane should not allow large molecules or ions through the pores (holes), but should allow smaller components of the solution (such as water) to pass freely.

In the normal osmosis process the solvent naturally moves from an area of low solute concentration, through a membrane, to an area of high solute concentration. The movement of a pure solvent to equalize solute concentrations on each side of a membrane generates osmotic pressure. Applying an external pressure to reverse the natural flow of pure solvent, thus, is reverse osmosis. Reverse osmosis, however, involves a diffusive mechanism so that separation efficiency is dependent on solute concentration, pressure, and water flux rate. Reverse osmosis is most commonly known for its use in drinking water purification from seawater, removing the salt and other substances from the water molecules.

Conventional RO membranes are known to remove about 90% TDS from the input water. Therefore, in some cases, the output water (permeate) may have as low as 4 to 5 ppm TDS which may be perceived unacceptably bitter. On the other hand, if the TDS of input water is about 2000 ppm; the permeate having TDS more than 200 ppm may be perceived salty.

Therefore, in order to balance the TDS of the permeate water, some RO devices use remineralisation means.

An RO membrane rejects dissolved salts to the tune of 95%, so different feed waters (with different TDS values) result in permeates of different TDS (because of constant % rejection of dissolved salts by the RO membrane). For example, 1000 ppm input feed water will give 50 ppm permeate water and, 500 ppm input feed water will give 25 ppm permeate water and soon. There is another stream of water that exits the RO membrane which is the reject water line. This carries all the salt that has been rejected by the membrane and is typically much richer than the feed in terms of salt concentration. This invention senses TDS of the feed (by actually measuring TDS of permeate and back-calculating the feed TDS) and then decides to partially recycle the reject so that the feed may be concentrated and the permeate from this 'concentrated' feed is therefore higher in TDS than it would be in the case of a regular single-pass RO. Therefore, by judiciously deciding when to recycle and when not to, a relatively constant TDS of the permeate or treated water can be maintained.

It was a surprising finding that the water dispensing device of the present invention with the given flow path of water and the control circuit configured store at least two threshold TDS values $X_A$ and $X_B$, wherein $X_A$ is a higher TDS value than $X_B$; and to drain water from the treatment unit through the drain line, when TDS value sensed is higher than $X_A$, and alternately when the sensed value of TDS is less than $X_B$ then direct water from the reject line into the first recycle line; it was seen that the TDS of the output water of the device was in a constant range and the device of the present invention also contributed to minimizing the wastage of water by allowing recycling of water through the reject line of the treatment unit.

The invention also provides a device that works dynamically to continuously sense the TDS levels of the output water and then take action to ensure that the taste of the output water remains nearly constant and palatable to the consumer throughout the life of the water dispensing device, the treatment unit and irrespective of the source of water used. The device of the present invention is also beneficial for providing water with desirable TDS levels by the same device in different regions and localities irrespective of the input TDS water levels used as feed water into the device.

The preferred constant TDS range of drinking water is desirable between 30 to 250 ppm, more preferably between 50 to 150 ppm and most preferably between 70 to 120 ppm which can be achieved by the device of the present invention by using the threshold TDS value $X_A$ in the range of 3000 to 800 ppm, more preferably in the range of 2500 to 1000 ppm and most preferably in the range of 2000 to 1200; and the threshold TDS value $X_B$ in the range of 650 to 200 ppm, more preferably in the range of 500 to 250 ppm and most preferably in the range of 550 to 300 ppm.

However, the device and method of the present inventions is capable of achieving any constant TDS range value irrespective of the input/feed water TDS value. This can be done by choosing an appropriate threshold values of TDS. Another advantage of the device is that for the same device, the desired TDS of the output water from the device can be varied as per the requirement or taste of the consumer simply by varying the threshold TDS values. The device of the present invention is therefore capable of being employed in any industry where a constant range of TDS of the output water is desired.

Another major advantage of the present invention is the contribution to sustainable environment by reduction of water wastage through the reject water line, by partial recycling of water.

The present invention is also useful for providing any desired TDS range, which may not be necessarily used for drinking but any other desired purpose, wherein the treatment unit could be any industrial treatment unit. This would ensure that irrespective of the feed water source or the treatment that the feed water undergoes inside a water dispensing device, the TDS of the output water can be in a desired range.

The Water Dispensing Device

The present invention present invention provides a water dispensing device for providing output water in a constant TDS range, the device comprising:
  a. a feed water inlet;
  b. a reverse osmosis unit positioned downstream and in fluid communication with the inlet; the treatment unit having a treated water line and a reject water line;

wherein, the reject water line is split by a multichannel connector into, a drain line for draining the reject water and a first recycle line adapted to allow reject water from the treatment unit, to flow into the line upstream of the treatment unit the first recycle line comprising a second drain line downstream of the multichannel connector;

and a second recycle line emanating from the reject line having a third drain line emanating from the second recycle line downstream of the multichannel connector, and wherein, either a multi-way valve is positioned at the multichannel connector or one valve corresponding for every split line, a drain line valve on the drain line and a first recycle line valve on the first recycle line downstream of the multichannel connector, and c. a TDS sensor on the treated water line adapted to measure TDS of the water flowing out of the treatment unit;

d. an outlet for dispensing water; and e. a control circuit configured to:
  i. store at least two threshold TDS values $X_A$ and $X_B$, wherein $X_A$ is a higher TDS value than $X_B$;
  ii. drain water from reject line of the treatment unit through the drain line, when TDS value sensed is higher than $X_A$, and alternately when the sensed value of TDS is less than $X_B$ then direct water from the reject line into the first recycle line; and
  iii. direct water to flow through the second recycle line (5C) when the sensed threshold value is higher than $X_B$ but less than $X_A$;
  when the device is in operation.

It is highly preferred that, the drain line has a first drain line flow restrictor for limiting the flow of water flowing through the drain line.

It is preferred that the first recycle line comprises a second drain line downstream of the multichannel connector and having a second drain line flow restrictor.

It is preferred that the device further comprises a second recycle line preferably emanating from the reject line, for flow of water from the reject line into the line upstream of the treatment unit, preferably the flow of water through the second recycle line being operably controlled either by a multi-way valve or a second recycle line valve.

It is preferred that the second recycle line has a third drain line preferably emanating from the second recycle line preferably downstream of the multichannel connector, and preferably having a third drain line flow restrictor.

It is further preferred that the device further comprises a mechanical unit preferably positioned upstream of the treatment unit to drive water into the treatment unit.

It is preferable that the first recycle line has a first flow restrictor preferably positioned downstream of the multichannel connector.

It is preferable that the second recycle line has a second flow restrictor preferably positioned downstream of the multichannel connector. It is highly preferable that the second flow restrictor allows at least 5% lower flow rate of water than the first flow restrictor.

It is preferable that the control circuit is further configured to direct water to flow through the second recycle line (5C) when the sensed threshold value is higher than $X_B$ but less than $X_A$ when the device is in operation.

It is preferred that the control circuit is further configured to choose from the options selected from the group:

i. water from the reject line only flows through the drain line when sensed TDS is higher than $X_A$; or
  ii. water from the reject line flows through the first recycle line and a second drain line when sensed TDS is less than $X_B$; or
  iv. when water from the reject line flows through the second recycle line and the third drain line when sensed TDS is higher than $X_B$ and less than $X_A$;
  when the device is in operation.

The water dispensing device is preferably a water purification device dispensing purified water. It may preferably also have a sediment filter for pre-treatment generally placed before the treatment unit. Such filters may be made of woven or non-woven cloth or a carbon block. The fabric may be made of natural fibers or of synthetic origin. Non-woven cloth made of cotton, polyester, polypropylene, or nylon is preferred. A typical carbon block includes bound activated carbon particles.

It is also highly preferred to have purification units post the treatment unit such as UV treatment unit and/or a post carbon block and the ones common in the industry of water purification.

A Feed Water Inlet

A feed water inlet is an inlet for providing water to the water dispensing device for purification and/or treatment and may have a varying variety of feed water entering into the device through the inlet. The inlet is preferably in fluid communication with the treatment unit. The feed water inlet can provide water from various sources which may have any TDS value.

A Reverse Osmosis Unit

A reverse osmosis unit as a component of the device of the present invention could be a unit for treating water in any sense and is used broadly to mean bringing out any change in the composition of water which is dispensed out of the devise for use. It is preferred that the treatment unit in some manner alters the TDS content of the raw water. It is more preferred that the treatment unit is a desalination unit and most preferably a reverse osmosis unit.

The treatment unit is positioned downstream and in fluid communication with the inlet; the treatment unit having a treated water line and a reject water line; wherein, the reject water line is split by a multichannel connector into at least two lines, a first recycle line adapted to allow reject water from the treatment unit to flow into the line upstream of the treatment unit and a drain line for draining the reject water, wherein either a multi-way valve is positioned at the multichannel connector or one valve corresponding for every split line, a drain line valve on the drain line and a first recycle line valve on the first recycle line downstream of the multichannel connector.

It is preferred that the device further comprises at least one second recycle line a second recycle line emanating from the reject line, for flow of water from the reject line into the line upstream of the treatment unit, the flow of water through the second recycle line being operably controlled either by a multi-way valve or a second recycle line valve.

The treated water from the treatment unit flows out through the treated water line which may further be treated or processed or may be dispensed through the outlet for dispensing water.

The treatment unit therefore has at least two lines for the water to flow out from it, the treated water line and the reject water line. The reject water line is further split by a multichannel connector into at least two lines, a recycle line and a drain line. A multichannel connector preferably serves the purpose to split the reject line into higher number of lines of which minimum is two. The multichannel connector could be a separate part used for connecting the reject line with the different lines into which it is split or it may be molded as a single piece splitting into different lines. A multi-way valve could be positioned at the multichannel connector or a separate valve could be present corresponding to each split line emanating from the reject line of the reverse osmosis unit, such as a drain line valve on the drain line and a recycle line valve on each of the recycle lines downstream of the multichannel connector and a second recycle line valve on the second recycle line if present.

It is preferable that the first recycle line has a first recycle line flow restrictor positioned downstream of the multichannel connector and more preferably positioned downstream of the multi-way valve or the first recycle line valve as the case may be.

It is preferable that the when the second recycle line is present, it has a second recycle line flow restrictor positioned downstream of the multichannel connector and more preferably positioned downstream of the multi-way valve or the second recycle line valve as the case may be.

It is highly preferable that each of the recycle lines is provided with corresponding flow restrictors downstream of the multichannel connector and more preferably downstream of either the multi-way valve positioned at the multichannel connector or the corresponding valves on each of the recycle lines, as the case may be. The flow restrictor helps in limiting or restricting the flow of the water, such that when the water flows through the first recycle line, and the second drain line simultaneously when sensed value of TDS is less than $X_B$; or flows through the second recycle line, and the third drain line simultaneously when present and when sensed value of TDS is higher than $X_B$ and less than $X_A$; then the amount of water to be recycled could be controlled through the choice of flow restrictor on each of the lines. It is furthermore preferable to have a flow restrictor on the first drain line, more preferably on the first and second drain lines and most preferably on the first, second and third drain lines. It is further preferred that the first recycle line flow restrictor allows at least 5% more volume of water to pass through per minute it as compared to the second recycle line flow restrictor.

When the treatment unit is a reverse osmosis (RO) unit, then the unit comprises a reverse osmosis (RO) membrane. RO membranes are commercially available for industrial and domestic use. The RO membranes may be made in a variety of configurations, with the most preferred configuration being the TFC (thin film composite). A preferred RO membrane is FILMTEC™ Membranes Product TW30-1812-50 from The Dow Chemical Company.

A Total Dissolved Solids (TDS) Sensor

The device of the present invention includes a 'total dissolved solids' (TDS) measuring means or a Total Dissolved Solids (TDS) sensor positioned on the treated water line, adapted to determine the total dissolved solids adapted to measure TDS of the water flowing out of the treatment unit; and communicating the measured value to the control circuit.

The TDS sensor is therefore positioned downstream of the treatment unit and is adapted to measure the TDS of water on the treated water line when the device is in operation.

The term "dissolved solids" refers generally to any minerals, salts, metals, cations or anions that are dissolved in a water sample. Dissolved solids include many of the substances that impair water color, odor, taste, or overall water quality. Many industries, and the food service industry in particular, require that the water used be held to stringent standards such that the color, odor, or taste of the water does not have any adverse effect on the end product.

A TDS sensor may be of any type being capable of sensing or measuring the total dissolved solids. A commonly used TDS meter displays the TDS in parts per million (ppm). For example, a TDS reading of 1 ppm would indicate there is 1 milligram of dissolved solids in 1 kilogram of water. It possible to estimate the TDS level by measuring the electrical conductivity (EC) of the water with a meter and converting. A TDS meter may be an EC meter converting an EC reading to represent the TDS in the sample. Some meters can be selected to display either value.

Control Circuit

The device of the present invention includes a control circuit preferably configured to control the various components of the device. The control circuit can be either manually or automatically controlled.

The control circuit is configured to store at least two threshold TDS values $X_A$ and $X_B$, wherein $X_A$ is a higher TDS value than $X_B$; and to drain water from reject line of the treatment unit through the drain line, when TDS value sensed is higher than $X_A$, and alternately when the sensed value of TDS is less than $X_B$ then direct water from the reject line into the first recycle line.

It is further preferred that the control circuit is further configured to choose from the options selected from the group:

i. water from the reject line only flows through the drain line when sensed TDS is higher than $X_A$; or
ii. water from the reject line flows through the first recycle line and a second drain line when sensed TDS is less than $X_B$; or
iii. when water from the reject line flows through the second recycle line and the third drain line when sensed TDS is higher than $X_B$ and less than $X_A$;

when the device is in operation.

Preferably the control circuit comprises a memory. It preferably, includes a simple feedback circuitry or a microprocessor. Preferably the microprocessor control system is a programmable loop controller (PLC) system capable of monitoring the resistance, impedance, or conductance of the electrodes to enable the adjusting of power output to the electrodes via a connection. Preferably the microprocessor system is associated with software adapted to drive the microprocessor control system.

Alternatively, the control circuit may be an analogue system utilising comparators or a digital system without a microprocessor.

Preferably there is a flow rate and/or pressure detecting means adapted to detect the flow or pressure of water entering the device to switch the system on or off in the presence or absence of the flow of water in the device. It is preferred that the flow and/or pressure detecting means can be associated with a timer adapted also to switch the system on and off.

Preferably there is a flow control means for controlling the rate of flow of liquid through the device. For example, the flow control unit may be connected to one or more pumps and/or one or more valves controllable to vary the flow of the water through the device.

Preferably the control circuit includes a constant current circuitry which are well known to a person skilled in the art, any known constant current circuitry may be used for the purpose which measures and/or stores the TDS values and compare the stored threshold TDS values with the real-time sensed TDS values.

The control circuit stores a threshold value of TDS and compares with the real-time TDS data sensed by TDS sensor, with the stored threshold TDS value. If the sensed TDS value at a given time is higher than the threshold TDS value $X_A$, then the water from the reject water line is drained into the drain line and alternately when the sensed value of TDS is less than $X_B$ then direct water from the reject line into the first recycle line, more preferably, when the second recycle line is present and the sensed TDS value is less than $X_A$ and higher than $X_B$, the water is directed into the second recycle line.

The control circuit preferably operably controls the multi-way valve positioned on the multichannel connector when present or the corresponding drain line valve, the first recycle line valve and the second recycle line valves, when present. It is also preferable that the control circuit controls the mechanical unit such as a pump.

Mechanical Unit

It is highly preferable that the device of the present invention has a mechanical unit positioned upstream of the reverse osmosis unit to facilitate water into the reverse osmosis unit. It is preferred that the mechanical unit provides pressure to the water flowing into the treatment unit. A pressure of 80 psig or more is preferred of the water that enters into the treatment unit. It is more preferred that the mechanical unit is placed downstream of the water storage chamber. It is highly preferred that the mechanical unit is an electromechanical unit such as a pump. When a pump is used, any type of pump used in the industry of water dispensing devices could be employed which serves the purpose of providing pressure to the water entering treatment unit. It is preferable that the mechanical unit is controlled by the control circuit. It is preferable to employ diaphragm pumps.

Method

The present invention provides a method for providing output water in a constant TDS range by the device according to the first aspect, the method comprising,
i. providing water through inlet into the treatment unit;
ii. sensing TDS of the water in the treated water line by the TDS sensor;
iii. configuring the control circuit to a set at least two threshold values of TDS, $X_A$ and $X_B$;
iv. comparing the TDS sensed in step with the stored threshold TDS values $X_A$ and $X_B$; and
v. drain water from reject line of the treatment unit only through the drain line, when TDS value sensed is higher than $X_A$, and alternately when the sensed value of TDS is less than $X_B$ then direct water from the treatment unit into the first recycle line;
to obtain the output water in a constant TDS range.

It is preferred that the method further comprises directing water to flow through the second recycle line when the sensed threshold value is higher than $X_B$ but less than $X_A$.

It is preferred that in the method of the present invention, when the device is in operation, the control circuit is configured such that water from the reject line has the options selected from the group of:
i. water from the reject line only flows through the drain line when sensed TDS is higher than $X_A$; or
ii. water from the reject line flows through the first recycle line and a second drain line when sensed TDS is less than $X_B$; or
iii. when water from the reject line flows through the second recycle line and the third drain line when sensed TDS is higher than $X_B$ and less than $X_A$; when the device is in operation.

It is preferred that in the method of the present invention, when option (i) is chosen during operation of the device, there is no recycling of output water from the from the reject line.

It is preferred that in the method of the present invention, when option (ii) is chosen during operation of the device, it allows recycling of output water from the from the reject line in the range of 70 to 95% the volume of total reject water from the treatment unit.

It is preferred that in the method of the present invention, when option (iii) is chosen during operation of the device, it allows recycling of output water from the from the reject line in the range of 25 to 70% of the volume of total reject water from the treatment unit.

It is preferred that in the method of the present invention, that the drain line has a first drain line flow restrictor for limiting the flow of water flowing through the drain line.

It is preferred that in the method of the present invention, that the first recycle line comprises a second drain line downstream of the multichannel connector and having a second drain line flow restrictor.

It is preferred that in the method of the present invention, that the device further comprises a second recycle line preferably emanating from the reject line, for flow of water from the reject line into the line upstream of the treatment unit, preferably the flow of water through the second recycle line being operably controlled either by a multi-way valve or a second recycle line valve.

It is preferred that in the method of the present invention, that the second recycle line has a third drain line preferably emanating from the second recycle line preferably downstream of the multichannel connector, and preferably having a third drain line flow restrictor.

It is preferred that in the method of the present invention, that the device further comprises a mechanical unit preferably positioned upstream of the treatment unit to drive water into the treatment unit.

It is preferred that in the method of the present invention, that the first recycle line has a first flow restrictor preferably positioned downstream of the multichannel connector.

It is preferred that in the method of the present invention, that the second recycle line has a second flow restrictor preferably positioned downstream of the multichannel connector. It is highly preferable that the second flow restrictor allows at least 5% lower flow rate of water than the first flow restrictor.

It is preferred that in the method of the present invention, that the control circuit is further configured to choose from the options selected from the group:
i. water from the reject line only flows through the drain line when sensed TDS is higher than $X_A$; or
ii. water from the reject line flows through the first recycle line and a second drain line when sensed TDS is less than $X_B$; or
iii. when water from the reject line flows through the second recycle line and the third drain line when sensed TDS is higher than $X_B$ and less than $X_A$; when the device is in operation.

It is preferred that in the method of the present invention, the first flow restrictor allows at least 5% more volume of water per minute to pass through it as compared to the second flow restrictor.

Use

The present invention provides use of the device according to the device of the present invention for minimizing waste water.

The present invention also provides use of the device according to the device of the present invention for maintaining TDS of output water from the device in a constant range.

The present invention also provides use of the control circuit configured to choose from the options selected from the group:
  i. water from the reject line only flows through the drain line when sensed TDS is higher than $X_A$; or
  ii. water from the reject line flows through the first recycle line and a second drain line when sensed TDS is less than $X_B$; or
  iii. when water from the reject line flows through the second recycle line and the third drain line when sensed TDS is higher than $X_B$ and less than $X_A$;
  when the device is in operation;
in a water dispensing device for providing output water in a constant TDS range, the device comprising:
  a. a feed water inlet;
  b. a reverse osmosis unit positioned downstream and in fluid communication with the inlet; the treatment unit having a treated water line and a reject water line;
    wherein, the reject water line is split by a multichannel connector into at least two lines, a drain line for draining the reject water and a first recycle line adapted to allow reject water from the treatment unit, to flow into the line upstream of the treatment unit; and
    wherein, either a multi-way valve is positioned at the multichannel connector or one valve corresponding for every split line, a drain line valve on the drain line and a first recycle line valve on the first recycle line downstream of the multichannel connector, and
  c. a TDS sensor on the treated water line adapted to measure TDS of the water flowing out of the treatment unit;
  d. an outlet for dispensing water;
to provide TDS of the output water from the treatment unit in a constant range.

The present invention provides a control circuit configured to choose from the options selected from the group:
  i. water from the reject line only flows through the drain line when sensed TDS is higher than $X_A$.
  ii. water from the reject line flows through the first recycle line and a second drain line when sensed TDS is less than $X_B$; or
  iii. when water from the reject line flows through the second recycle line and the third drain line when sensed TDS is higher than $X_B$ and less than $X_A$;
  when the device is in operation;
for use in a water dispensing device for minimizing wastage of water. The water dispensing device preferably comprising:
  a. a feed water inlet;
  b. a reverse osmosis unit positioned downstream and in fluid communication with the inlet; the treatment unit having a treated water line and a reject water line;
    wherein, the reject water line is split by a multichannel connector into at least two lines, a drain line for draining the reject water and a first recycle line adapted to allow reject water from the treatment unit, to flow into the line upstream of the treatment unit; and
    wherein, either a multi-way valve is positioned at the multichannel connector or one valve corresponding for every split line, a drain line valve on the drain line and a first recycle line valve on the first recycle line downstream of the multichannel connector; and
  c. a TDS sensor on the treated water line adapted to measure TDS of the water flowing out of the treatment unit; and
  d. an outlet for dispensing water.

The present invention provides a control circuit configured to choose from the options selected from the group:
  i. water from the reject line only flows through the drain line when sensed TDS is higher than $X_A$; or
  ii. water from the reject line flows through the first recycle line and a second drain line when sensed TDS is less than $X_B$; or
  iii. when water from the reject line flows through the second recycle line and the third drain line when sensed TDS is higher than $X_B$ and less than $X_A$;
  when the device is in operation;
for use in a water dispensing device for minimizing wastage of water. It is preferable that the water dispensing device comprises:
  a. a feed water inlet;
  b. a reverse osmosis unit positioned downstream and in fluid communication with the inlet; the treatment unit having a treated water line and a reject water line;
    wherein, the reject water line is split by a multichannel connector into at least two lines, a drain line for draining the reject water and a first recycle line adapted to allow reject water from the treatment unit, to flow into the line upstream of the treatment unit; and
    wherein, either a multi-way valve is positioned at the multichannel connector or one valve corresponding for every split line, a drain line valve on the drain line and a first recycle line valve on the first recycle line downstream of the multichannel connector; and
  c. a TDS sensor on the treated water line adapted to measure TDS of the water flowing out of the treatment unit;
  d. an outlet for dispensing water.

It is highly preferable that for a water dispensing device used for drinking water purposes the value of $X_A$ ranges from 1000 to 1500 ppm and $X_B$ value ranges from 400 to 700 ppm.

FIG. 1 shows water the dispensing device (1) of the present invention for providing output water in a constant TDS range, the device comprising:
  i. a feed water inlet (2);
  ii. a reverse osmosis unit (4) positioned downstream and in fluid communication with the inlet (2); the treatment unit (4) having a treated water line (14) and a reject water line (5);
    wherein, the reject water line (5) is split by a multichannel connector (3) into, a drain line (5A) for draining the reject water and a first recycle line (5B) adapted to allow reject water from the treatment unit (4), to flow into the line upstream of the treatment unit (4) the first recycle line comprising a second drain line (5B'D) downstream of the multichannel connector (3);
    and a second recycle line (5C) emanating from the reject line (5) having a third drain line (5C'D) emanating from the second recycle line (5C) downstream of the multichannel connector (3);
    and
    wherein, one valve corresponding for every split line, a drain line valve (9) on the drain line (5A) and a first recycle line valve (10) on the first recycle line (5B) downstream of the multichannel connector (3) is shown;

iii. a TDS sensor (7) on the treated water line (14) adapted to measure TDS of the water flowing out of the treatment unit (4);

iv. an outlet for dispensing water (11).

The first recycle line (5B) comprises a second drain line (5B'D) downstream of the multichannel connector (3) and having a second drain line flow restrictor (5BD'FR). The drain line (5A) is also shown to have a first drain line flow restrictor (5A'FR) for limiting the flow of water flowing through the drain line (5A) and a flow restrictor (5B'FR) is shown to be positioned on the recycle line. A mechanical unit such as a pump (12) is present upstream of the treatment unit (4) to provide pressurized water into the treatment unit (4)

Figure 2:
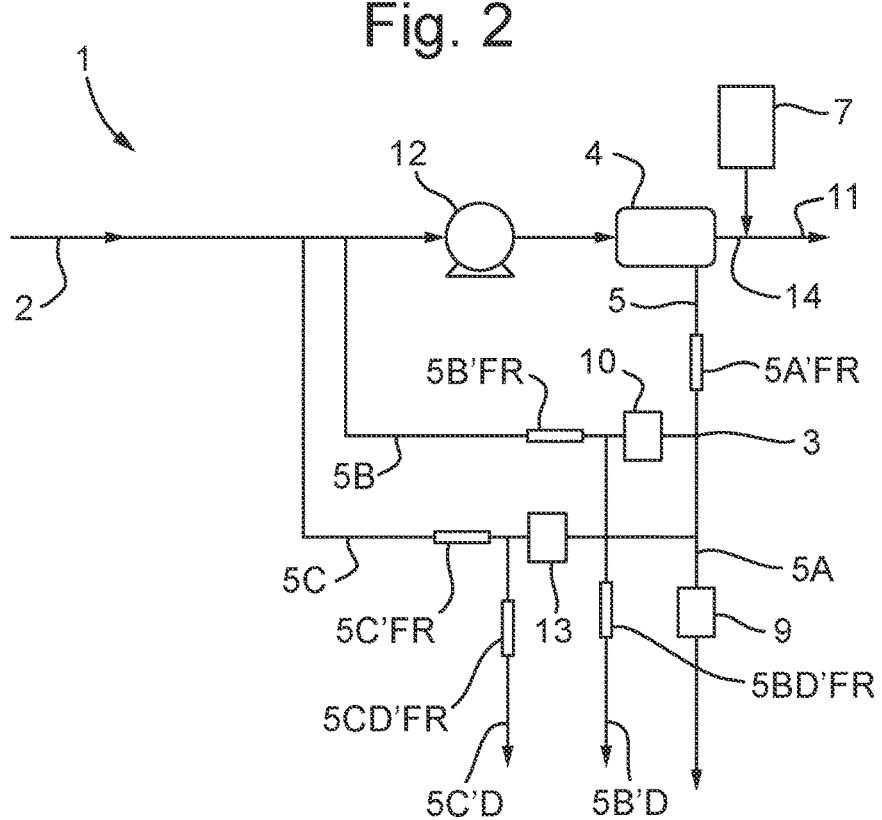

FIG. 2 shows features as shown in FIG. 1, with addition of a preferable feature of having a second recycle line (5C). The second recycle line (5C) having a second recycle line flow restrictor (5C'FR), the second recycle line (5C) emanates from the reject line (5), for flow of water from the reject line (5) into the line upstream of the treatment unit (4), the flow of water through the second recycle line being operably controlled either by a second recycle line valve (13). The second recycle line (5C) further has a third drain line (5C'D) emanating from the second recycle line (5C) downstream of the multichannel connector (3), and having a third drain line flow restrictor (5CD'FR).

Figure 3:
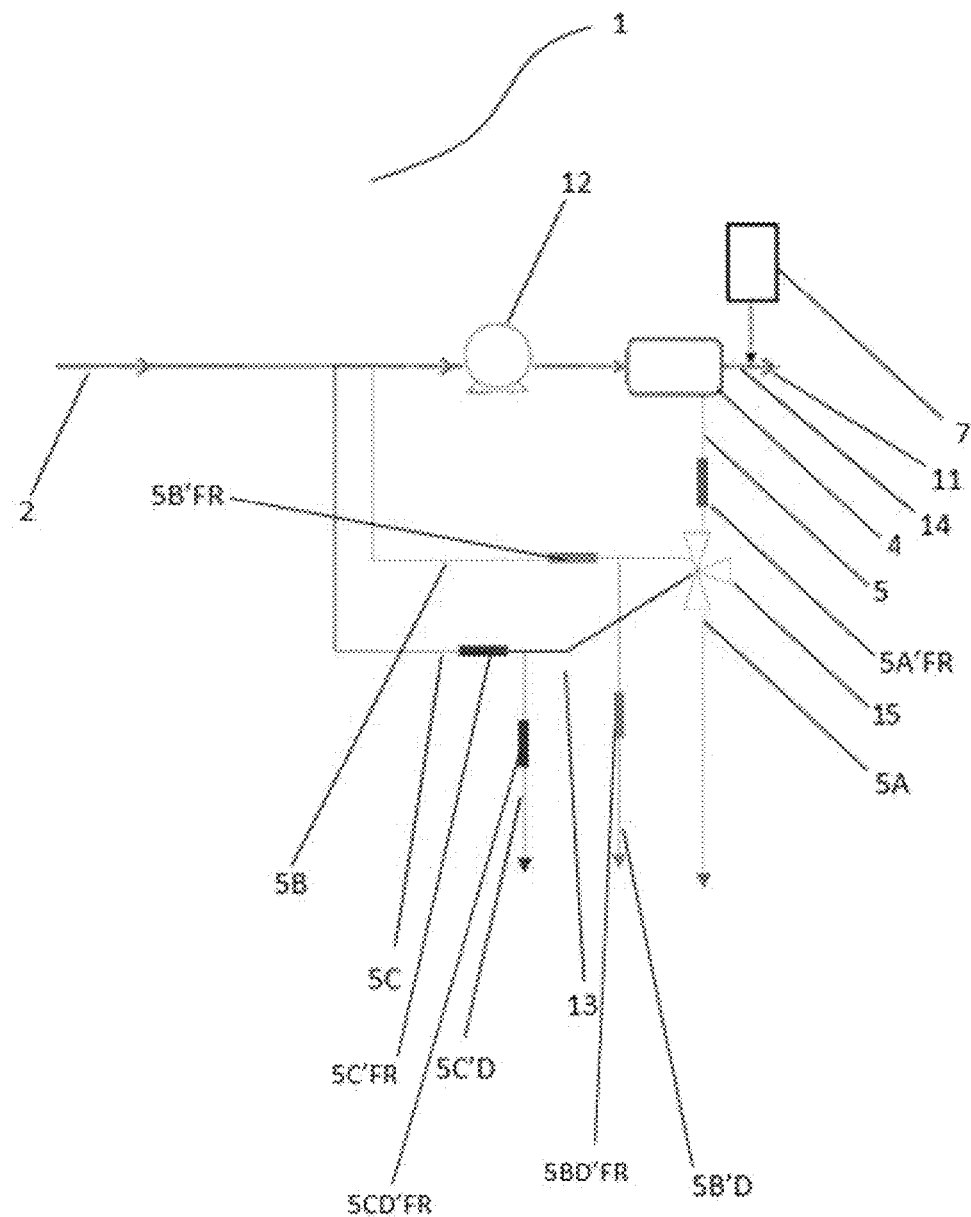

FIG. 3 shows the features of FIG. 2 with a difference of having a multi-way valve (15) positioned on the multichannel connector (3) instead of valves for corresponding first and second recycle lines and the drain line. FIG. 3 shows employment of multi way valve (15) in place of valves (9, 10 and 13) on the respective drain line (5A), first recycle line (5B) and the second recycle line (5C).

In an exemplary case, the device of the present invention is provided and the control circuit of the device is configured to store a threshold TDS $X_A$ of 1500 ppm and $X_B$ of 500 ppm and store at least two threshold TDS values $X_A$ and $X_B$, wherein $X_A$ is a higher TDS value than $X_B$; and drain water from reject line of the treatment unit through the drain line, when TDS value sensed is higher than $X_A$, and alternately when the sensed value of TDS is less than $X_B$ then direct water from the reject line into the first recycle line. When the device is in operation, the water will enter the feed water inlet supposing having a TDS of 4000 ppm entering into the treatment unit, preferably pressurized, preferably through a mechanical unit into the treatment unit. The treatment unit in turn will treat the water and the treated water will flow out of the treatment unit into the treated water line which has a TDS sensor positioned on it to sense the TDS of the treated water. The discard water from the treatment unit will flow out of the treatment unit via the reject line. The reject water line is split by a multichannel connector into at least two lines, a drain line for draining the reject water and a first recycle line adapted to allow reject water from the treatment unit, to flow into the line upstream of the treatment unit. There is provided either a multi-way valve is positioned at the multichannel connector or one valve corresponding for every split line, a drain line valve on the drain line and a first recycle line valve on the first recycle line downstream of the multichannel connector. At a given time, suppose the sensed TDS is 1600 ppm, which is above the threshold threshold TDS $X_A$ of 1500 ppm, then the water from the treatment unit will be drained through the drain line and there will be no recirculation or recycling of water from the reject line and all the water will be drained, and this process will continue until the TDS of the water sensed at the treated water line falls to less than the threshold value of $X_A$ of 1500 ppm.

At another time point, if the TDS sensor senses TDS of the treated water to be 100 ppm, which is less than $X_B$ of 500 ppm, then according to the configuration of the control circuit, water from the reject line will be directed into the first recycle line and by the operation of either a multi-way valve positioned at the multichannel connector or one valve corresponding for every split line, a drain line valve on the drain line, a first recycle line valve on the first recycle line and a second recycle line valve on the second recycle line, when present, downstream of the multichannel connector, the working of the valves ensure that the water preferably does not flow into the drain line and the second recycle line if present, but only through the first recycle line. If and when, separate valves are present corresponding to each line then preferably first recycle line valve will open to allow entry of water from the reject line into the first recycle line and preferably the drain valve and the second recycle line valve, if present will close to disallow entry of water into the drain line and the second recycle line in the scenario when the sensed TDS is less than $X_B$ TDS threshold value. In case a multiway valve is present then similarly the valve will be operated in manner to allow entry of water from the reject line into the first recycle line and disallow entry of water into the drain line and into the second recycle line, when that is present in the scenario when the sensed TDS is less than $X_B$ TDS threshold value.

It is preferable that the device of the present invention also comprises a second recycle line. When that is present, the control circuit is also configured to direct water to flow through the second recycle line when the sensed threshold value is higher than $X_B$ but less than $X_A$. At another time point, if the TDS sensor senses TDS of the treated water to be 1000 ppm, which is less than $X_A$ of 1500 ppm and more than $X_B$ of 500 ppm then according to the control circuit configuration, the water from the reject line will be directed into the second recycle line and by the operation of either a multi-way valve positioned at the multichannel connector or one valve corresponding for every split line, a drain line valve on the drain line and a first recycle line valve on the first recycle line and a second recycle line valve on the second recycle line downstream of the multichannel connector, the working of the valves ensure that the water preferably does not flow into the drain line or the first recycle line, but only through the second recycle line. If and when separate valves are present corresponding to each line then preferably second recycle line valve will open to allow entry of water from the reject line into the second recycle line and preferably the drain valve and the first recycle line valve will close to disallow entry of water into the drain line and into the first recycle line, in the scenario when the sensed TDS is between $X_A$ and $X_B$ TDS threshold values. In case a multiway valve is present then similarly the valve will be operated in manner to allow entry of water from the reject line into the second recycle line and disallow entry of water into the drain line and into the first recycle line in the scenario when the sensed TDS is between $X_A$ and $X_B$ TDS threshold values.

It is also highly preferable to have flow restrictors at each of the lines, a first recycle line flow restrictor, a second recycle line flow restrictor, a first drain line flow restrictor and preferably a flow restrictor for each of the drain lines emanating from the first and second recycle lines, a second drain line flow restrictor positioned on the drain line emanating from the first recycle line and a third drain line flow restrictor positioned on the drain line emanating from the second recycle line, when present.

The various features of the present invention referred to in individual sections above apply, as appropriate, to other sections mutatis mutandis. Consequently, features specified in one section may be combined with features specified in other sections as appropriate. Any section headings are added for convenience only, and are not intended to limit the disclosure in any way.

The invention is not limited to the embodiments illustrated in the drawings. Accordingly, it should be understood that where features mentioned in the claims are followed by reference numerals, such numerals are included solely for the purpose of enhancing the intelligibility of the claims and are in no way limiting to the scope of the claims.

The invention claimed is:

1. AA water dispensing device (1) for providing output water in a constant TDS (Total dissolved solids) range, the device comprising:
   a. a feed water inlet (2);
   b. a reverse osmosis unit (4) positioned downstream and in fluid communication with the inlet (2); the reverse osmosis unit (4) having a treated water line (14) and a reject water line (5);
      wherein, the reject water line (5) is split by a multichannel connector (3) into, a drain line (5A) for draining the reject water and a first recycle line (5B) adapted to allow reject water from the treatment unit (4), to flow into the line upstream of the reverse osmosis unit (4), the first recycle line comprising a second drain line (5B'D) downstream of the multichannel connector (3);
      and a second recycle line (5C) emanating from the reject water line (5) for flow of water from the reject water line (5) into the line upstream of the reverse osmosis unit (4), the second recycle line (5C) having a third drain line (5C'D) emanating from the second recycle line (5C) downstream of the multichannel connector (3);
      and
      wherein, either a multi-way valve (15) is positioned at the multichannel connector (3) or one valve respectively corresponding for every split line, a drain line valve (9) on the drain line (5A) and a first recycle line valve (10) on the first recycle line (5B) downstream of the multichannel connector (3); and
   c. a TDS sensor (7) on the treated water line (14) adapted to measure TDS of the water flowing out of the reverse osmosis unit (4);
   d. an outlet for dispensing water (11); and
   e. a control circuit configured to:
      i. store at least two threshold TDS values $X_A$ and $X_B$, wherein $X_A$ is a higher TDS value than $X_B$; and
      ii. configured to choose from the options selected from the group:
         a. water from the reject line (5) only flows through the drain line (5A) when sensed TDS is higher than $X_A$; or
         b. water from the reject line (5) flows through the first recycle line (5B) and a second drain line (5B'D) when sensed TDS is less than $X_B$; or
         c. when water from the reject line (5) flows through the second recycle line (5C) and the third drain line (5C'D) when sensed TDS is higher than $X_B$ and less than $X_A$;
      when the device is in operation;
   wherein, the first recycle line (5B) has a first flow restrictor (5B'FR) positioned downstream of the multichannel connector (3); and
   wherein the second recycle line (5C) has a second flow restrictor (5C'FR) positioned downstream of the multichannel connector (3), for flow of water from the reject line (5) into the line upstream of the reverse osmosis unit (4), the flow of water through the second recycle line being operably controlled either by the multi-way valve (15) or a second recycle line valve (13); and wherein the second flow restrictor (5C'FR) allows at least 5% lower flow rate of water than the first flow restrictor (5B'FR).

2. The device according to claim 1, wherein the drain line (5A) has a first drain line flow restrictor (5A'FR) for limiting the flow of water flowing through the drain line (5A).

3. The device according to claim 1, wherein the second drain line (5B'D) has a second drain line flow restrictor (5BD'FR).

4. The device according to claim 1, wherein, the third drain line (5C'D) has a third drain line flow restrictor (5CD'FR).

5. The device according to claim 1, wherein the device further comprises a mechanical unit (12) positioned upstream of the reverse osmosis unit (4) to drive water into the reverse osmosis unit (4).

6. The method for providing output water in a constant TDS range by the device according to claim 1, the method comprising,
   a. providing water through inlet (2) into the reverse osmosis unit (4);
   b. sensing TDS of the water in the treated water line (14) by the TDS sensor (7);
   c. configuring the control circuit to a set at least two threshold values of TDS, $X_A$ and $X_B$;
   d. comparing the TDS sensed in step (b) with the stored threshold TDS values $X_A$ and $X_B$;
   e. configuring the second flow restrictor (5C'FR) to allow at least 5% lower flow rate of water than the first flow restrictor (5B'FR); and
   f. drain water from reject line (5)
      i. through the drain line (5A) when sensed TDS is higher than $X_A$; or
      ii. through the first recycle line (5B) and a second drain line (5B'D) when sensed TDS is less than $X_B$; or
      iii. through the second recycle line (5C) and the third drain line (5C'D) when sensed TDS is higher than $X_B$ and less than $X_A$;
   to obtain the output water in a constant TDS range.

* * * * *